(12) United States Patent
van der Veen

(10) Patent No.: US 7,103,631 B1
(45) Date of Patent: Sep. 5, 2006

(54) SYMMETRIC MULTI-PROCESSOR SYSTEM

(75) Inventor: Peter H. van der Veen, Kanata (CA)

(73) Assignee: QNX Software Systems, Ottawa (CA)

( * ) Notice: Subject to any disclaimer, the term of this patent is extended or adjusted under 35 U.S.C. 154(b) by 0 days.

(21) Appl. No.: 09/383,115

(22) Filed: Aug. 25, 1999

(30) Foreign Application Priority Data

Aug. 26, 1998 (CA) .......................................... 2245976

(51) Int. Cl.
*G06F 15/16* (2006.01)
*G06F 9/46* (2006.01)
*G06F 9/44* (2006.01)

(52) U.S. Cl. ...................... 709/205; 718/102; 718/105; 719/313

(58) Field of Classification Search .......... 718/102–105; 709/217–219, 223–226, 205–207, 103, 100, 709/104; 719/313, 317
See application file for complete search history.

(56) References Cited

U.S. PATENT DOCUMENTS

| | | | | |
|---|---|---|---|---|
| 4,480,304 A | | 10/1984 | Carr et al. .................. | 364/200 |
| 5,161,227 A | | 11/1992 | Dias et al. .................. | 395/650 |
| 5,202,991 A | * | 4/1993 | Gamache et al. ........... | 709/103 |
| 5,247,675 A | | 9/1993 | Farrell et al. ............... | 395/650 |
| 5,515,538 A | * | 5/1996 | Kleiman ..................... | 709/103 |
| 5,535,365 A | | 7/1996 | Barriuso et al. ............ | 395/482 |
| 5,596,754 A | | 1/1997 | Lomet ........................ | 395/726 |
| 5,771,382 A | * | 6/1998 | Wang et al. ................ | 709/103 |
| 5,812,844 A | * | 9/1998 | Jones et al. ................. | 709/100 |
| 5,946,487 A | * | 8/1999 | Dangelo ..................... | 345/502 |
| 6,119,115 A | * | 9/2000 | Barr ........................... | 709/104 |

OTHER PUBLICATIONS

Eykholt, J.R. et al. "Multithreading: Beyond Multiprocessing–Multithreading the SunOS Kernel", USENIX, Summer 1992, San Antonio, TX.*
Powell, M. L. et al, "SunOS Multi–thread Architecture" USENIX, Winter 1991, Dallas, TX.*
"Transformation of Simple Locks in Pageable Kernel"; IBM Technical Disclosure Bulletin, Mar. 1993, vol. 36, issue 3, pp. 385–386, NN9303385.*
Buehler, S., "Novell SMP: A Step Slow?", PC MAGAZINE, Jun. 25, 1996 "Overview of the Symmetric Multiprocessing Environment".
Unisys News Release, "Unisys Launches SMP 5400 Symmetric Multiprocessing Server", Aug. 1995 Good SMP Spinlock (was—> Re: RFC: Resource Management), SUN, Mar. 3, 1996.
Morgenstern, D., "Multiprocessing Ready to Boil Over at Expo" Macweek Report, Aug. 9, 1996 "Architecture Specific Code For the Intel MP Port", May 28, 1996.
"Execution Model", Utah Flux Project.

* cited by examiner

*Primary Examiner*—Bunjob Jaroenchonwanit
*Assistant Examiner*—Joseph E. Avellino
(74) *Attorney, Agent, or Firm*—Brinks Hofer Gilson & Lione

(57) ABSTRACT

The present invention relates generally to computer operating systems, and more specifically, to operating system calls in a symmetric multiprocessing (SMP) environment. Existing SMP strategies either use a single lock or multiple locks to limit access to critical areas of the operating system to one thread at a time. These strategies suffer from a number of performance problems including slow execution, large software and execution overheads and deadlocking problems. The invention applies a single lock strategy to a micro kernel operating system design which delegates functionality to external processes. The micro kernel has a single critical area, the micro kernel itself, which executes very quickly, while the external processes are protected by proper thread management. As a result, a single lock may be used, overcoming the performance problems of the existing strategies.

13 Claims, 7 Drawing Sheets

FIGURE 1 - PRIOR ART

SYMMETRIC MULTI-PROCESSOR SYSTEM

The present invention relates generally to computer operating systems, and more specifically, to operating system calls in a symmetric multiprocessing (SMP) environment.

BACKGROUND OF THE INVENTION

Generally, computer systems are designed to accept and execute various application programs provided by a User, using an operating system to manage the computer resources required to execute the application programs.

Computer systems, and multiprocessor computer systems in particular, may manage execution of application programs by grouping program steps into "threads". Multiprocessor systems may assign different threads from the same application program to be executed on different processors to optimise use of the available resources. Groups of program steps are more easily managed as threads rather than single program steps which would create very large management overheads.

In addition to the optimal groupings of program steps, these threads contain parameter values that ensure the threads are executed within the proper time, are properly synchronized with other threads, or satisfy other constraints of the system. Real time operating systems, for example, will force threads to be executed before certain time deadlines so that real time interaction is maintained.

Symmetric multiprocessing (SMP) is the processing of application programs and operating systems using multiple processors that share a common operating system and memory. A single copy of the operating system is available to all the processors who share equal access to a common memory via a communication path of some form. SMP systems may also be described as "tightly coupled" multi-processing or "shared everything" systems.

The goal of an SMP system is to dynamically balance the workload between the available processors, optimising the use of the resources and providing the User with faster operation. Adding more processors to an SMP system results in faster operation, though completely linear improvement is not attainable because there are always critical sections of the. Operation System that can only be executed one at a time. With completely linear improvement, two processors would run twice as fast as a single processor and three processors would run three times as fast as a single processor.

Because only a single copy of the operating system is available to all of the processors, two or more threads may attempt to access the same area of the operating system at the same time. Certain critical areas of the operating system will only be able to handle access by a single thread, otherwise causing unexpected or erroneous data to result. To prevent this, "locks" are commonly used to limit access to these critical areas to one processor or thread at a time. In order to access a critical area of the operating system, the thread must obtain the necessary lock or locks, and once it has completed execution, may make these locks available to other threads.

There are two common strategies to lock management: use of a single or global lock which locks the entire operating system, and use of multiple small locks which divide the operating system into isolated sections and lack each section separately.

In general, implementation of a single lock results in the timing shown in FIG. 1. If all three Processors 1, 2 and 3 require access to the operating system at the same time, only one will be given access and the other two must remain idle. Clearly, this strategy results in the overall system operating no faster than the speed of a single processor while operating system calls are being made. Because individual processors may operate uninhibited when they are not making operating systems calls, this strategy is still faster than a single processor.

More than one processor can access the operating system if different critical areas of the operating system are identified and a separate lock provided for each of these areas. Referring to FIG. 2, an example of the timing of this second strategy is presented. In this example, all three Processors 1, 2 and 3 require access to the operating system at the same time, but Processors 1 and 2 require access to area A of the operating system, while Processor 3 requires access to area B. Therefore, Processor 3 is free to execute its call to the operating system independent of Processors 1 and 2, which must access the operating system at different times because there is only a single lock available for each operating system area. The Microsoft NT operating system is an example of an operating system applying such a multiple lock strategy.

This multiple lock strategy suffers from a number of performance problems. As the number of locks increases, the code complexity of the lock management software and number of locks to be acquired by a given thread increases. For example, a single thread may require access to several areas of the operating system, requiring it to wait for all of the necessary locks to be made available. A thread may have obtained some, but not all of the locks it requires. While it is blocked, awaiting other locks to free up, it will be blocking any other threads waiting for the locks it has already obtained. This situation can result in deadlocking, where the computer system freezes because two threads are holding and waiting for each other's locks.

Even without deadlocking, this multiple lock strategy causes more time to be spent in searching and acquiring locks, and increases the difficulty of ensuring reliability.

There is also a commercial advantage to providing an operating system that rr is straightforward, as it is easier for driver programmers to write programs for the operating system. Use of multiple locks increases the complexity of the operating system, making the writing of driver programs more complex and time consuming, and the operation less predictable.

The most common architecture of SMP Operating Systems is described as a monolithic operating system. Monolithic operating systems incorporate most of the functionality of the operating system into a single program file, including input and At output routines. Microsoft Windows CE is an example of such a monolithic operation system.

Because of the large size of monolithic operating systems, operating system calls typically take a long period of time to execute. Therefore a single lock strategy will generally result in unacceptably long time delays to the SMP system. Because of these long delays, a multiple lock strategy is preferred over the single lock for a monolithic operating system, but suffers from the same performance problems and deadlocking hazards outlined above.

SMP systems are commonly used in personal computer and networked computer systems, high-capacity telecom switches, image processing, and aircraft simulators. As well, SMP allows customers to extend the life and increase the cost-effectiveness of their multiprocessor systems by adding processor cards and their computing power to their multi-processors rather than buying more systems.

There is therefore a need for a method and system of Symmetric Multiprocessing that addresses the problems outlined above. This design must be provided with consideration for speed of execution, reliability, complexity and scalability.

SUMMARY OF THE INVENTION

It is therefore an object of the invention to provide an improved system and method of scheduling threads in a symmetric multiprocessing operating system.

One aspect of the invention is broadly defined as a method of symmetric multiprocessing in which one or more processors, a first memory medium storing a micro kernel operating system in a machine executable form and a second memory storing a thread scheduler in a machine executable form are interconnected via a communication network, the method comprising the steps within the thread scheduler of: responding to a thread requiring a call to the micro kernel operating system by requesting a global lock; and responding to the global lock being available by performing the steps of: acquiring the global lock from the thread scheduler; performing the call to the micro kernel operating system; and releasing the global lock.

BRIEF DESCRIPTION OF THE DRAWINGS

These and other features of the invention will become more apparent from the following description in which reference is made to the appended drawings in which.

DETAILED DESCRIPTION OF PREFERRED EMBODIMENTS OF THE INVENTION

Figure 3:
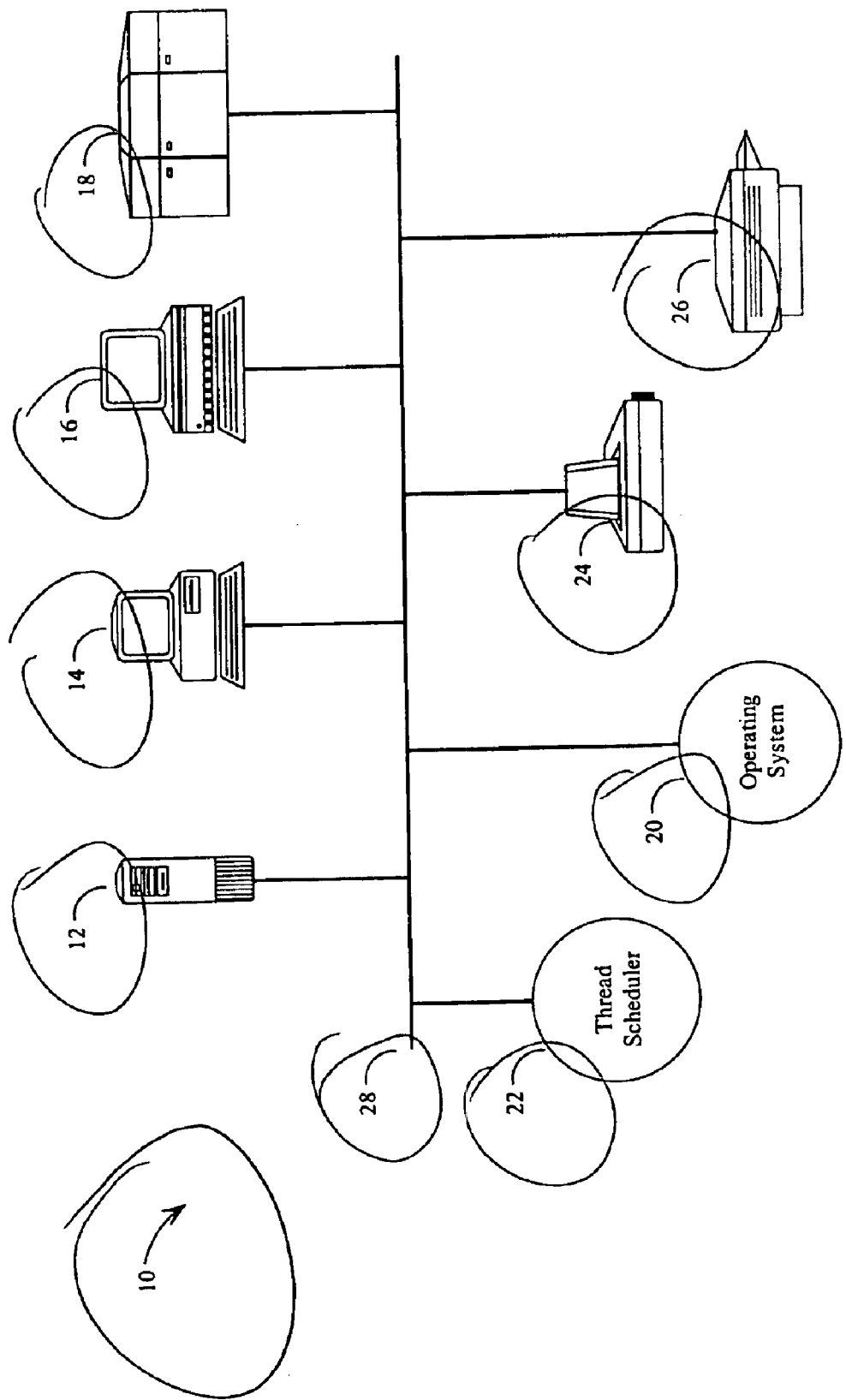
FIG. 3 presents a symbolic layout of a symmetrical multiprocessor system in a manner of the invention.

The invention may be described with respect to the general symmetric multiprocessor (SMP) layout 10 shown in FIG. 3. This figure presents an SMP layout consisting of a number of processors 12, 14, 16 and 18, operable to execute application programs, a memory medium storing an operating system 20, and a memory medium storing a thread scheduling program 22. This computer system 10 may also include a variety of peripherals such as a printer 24 and a scanner 26. These devices 12 through 26 may communicate with one another via a software bus 28.

The processors 12, 14, 16 and 18, may include personal computers, servers, micro controllers or other processing elements. Generally, each physical device on the system 10 is identified by a node address, so operation is essentially transparent to the physical arrangement. For example, while processor 12 may be operate as a server, the SMP system 10 does not treat it any differently than the other three processors 14, 16 and 18. The processors 12, 14, 16 and 18, are therefore described as "peers", each having equal access to the resources controlled by the operating system 20.

If an individual computer has a number of processors within it, each having access to the software bus 28, then each of these processors will also be considered to be a peer to any other processor accessible from the software bus 28. Processors which do not have direct access to the software bus 28 will require administration by another operating system.

The software bus 28 may consist of any manner of communication network which allows software data to be communicated between the processors 12, 14, 16 and 18 and other components of the system 10. The processors 12, 14, 16 and 18 may all reside on a single printed circuit board, in which case the software bus 28 may comprise copper tracks and the necessary input and output drivers. If the processors 12, 14, 16 and 18 comprise individual personal computers, then the software bus 28 may comprise electrical cable connections and communication hardware as known in the art.

The operating system 20 is generally stored in an executable form on a computer readable medium such as a random access memory (RAM), read only memory (ROM), optical disk (CD-ROM) or magnetic medium (hard drive or portable diskette). Of course, the operating system 20 could also be implemented by hardware means, or other means known in the art. The operating system 20 is accessible to each of the processors 12, 14, 16 and 18, and generally provides such capabilities as interprocess communications, message passing, data input and output, and timing services.

The thread manager 22 is also generally stored in an executable form on a similar computer readable memory medium accessible to each device via the software bus 28. The thread manager is not usually stored with the operating system 20 or within a processor 12, 14, 16 or 18, so that it is accessible at any time.

Figure 4:
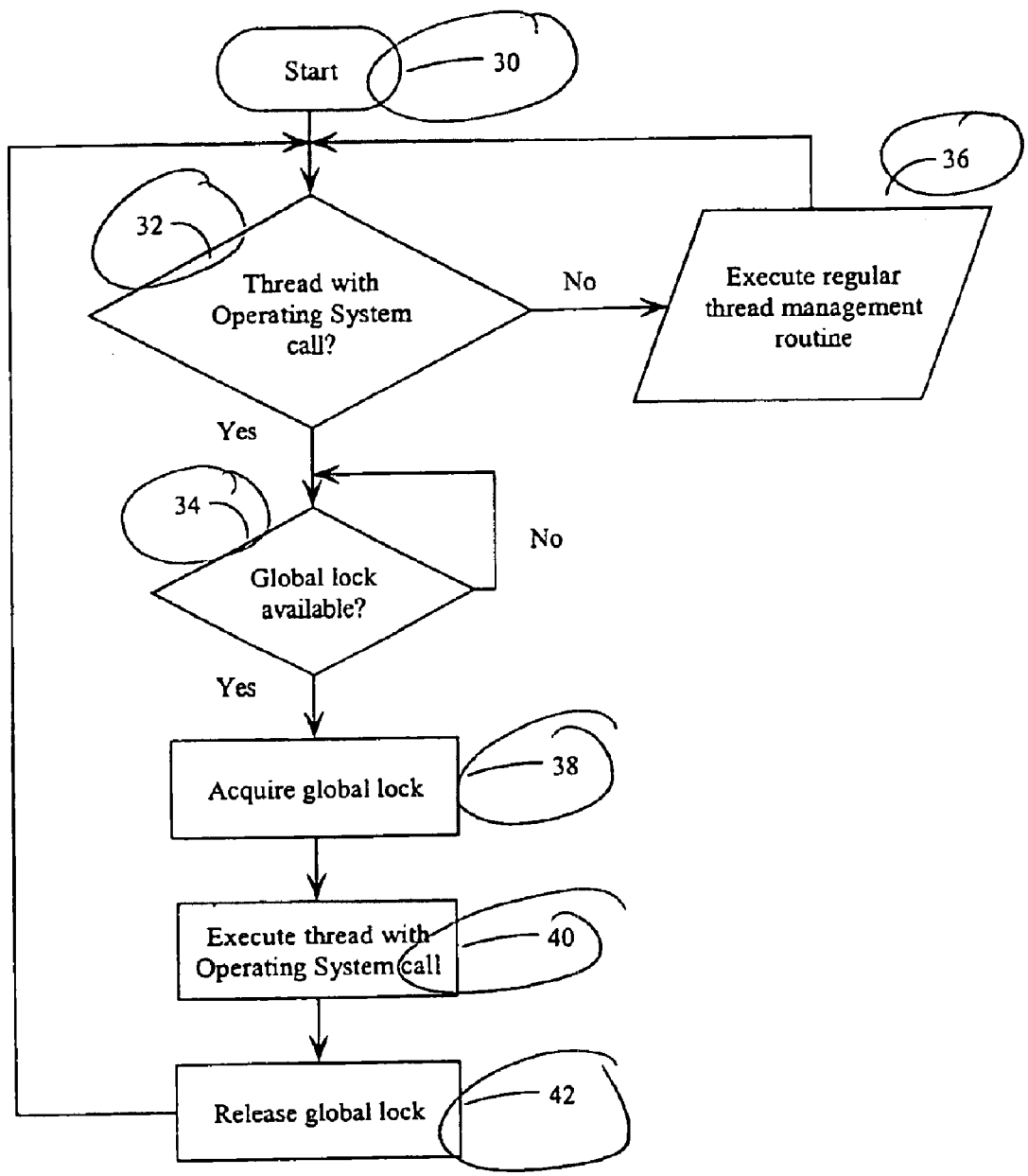
FIG. 4 presents a flow chart of a global lock management routine in a manner of the invention.

A thread scheduling program 22 which addresses the objects outlined above may be described by the flow chart of FIG. 4. This figure presents a method of symmetric multiprocessing in which one or more processors 12, 14, 16 and 18, a first memory medium storing a micro kernel operating system 20 in a machine executable form and a second memory storing a thread scheduler 22 in a machine executable form are interconnected via a communication network 28, possibly but not necessarily in the arrangement presented in FIG. 3. The method starting at step 30 comprises the steps within the thread scheduler 22 of: responding to a thread requiring access to the micro kernel operating system at step 32, by requesting a global lock at step 34. If the thread does not require access to the operating system, regular thread management is invoked at step 36. For the thread which does require access to the micro kernel operating system, the method then responds to the global lock being available by performing the steps of: acquiring the global lock at step 38; executing the thread on the micro kernel operating system 20 at step 40; and then releasing the global lock at step 42. Once the global lock has been released at step 42, control returns to step 32 to handle another thread. Until the global lock is made available to the thread, the request for the global lock remains in a tight loop at step 34.

In general, the invention requires that the SMP system take on a physical arrangement similar to that described above with respect to FIG. 3. Clearly modifications can be made to this physical arrangement which still obtain the benefits of the invention. Such modifications would be clear to one skilled in the art. As well, the invention may provide some benefit to completely different processing systems such as Asymmetric Multiprocessing systems.

The invention also requires, in a broad sense, that the operating system 20 be of a micro kernel architecture. A micro kernel operating system is one in the operating system itself provides minimal services which delegate the usual operating system functions to external processes. These services are generally described as Inter-Process Control or IPC services.

Figure 5:
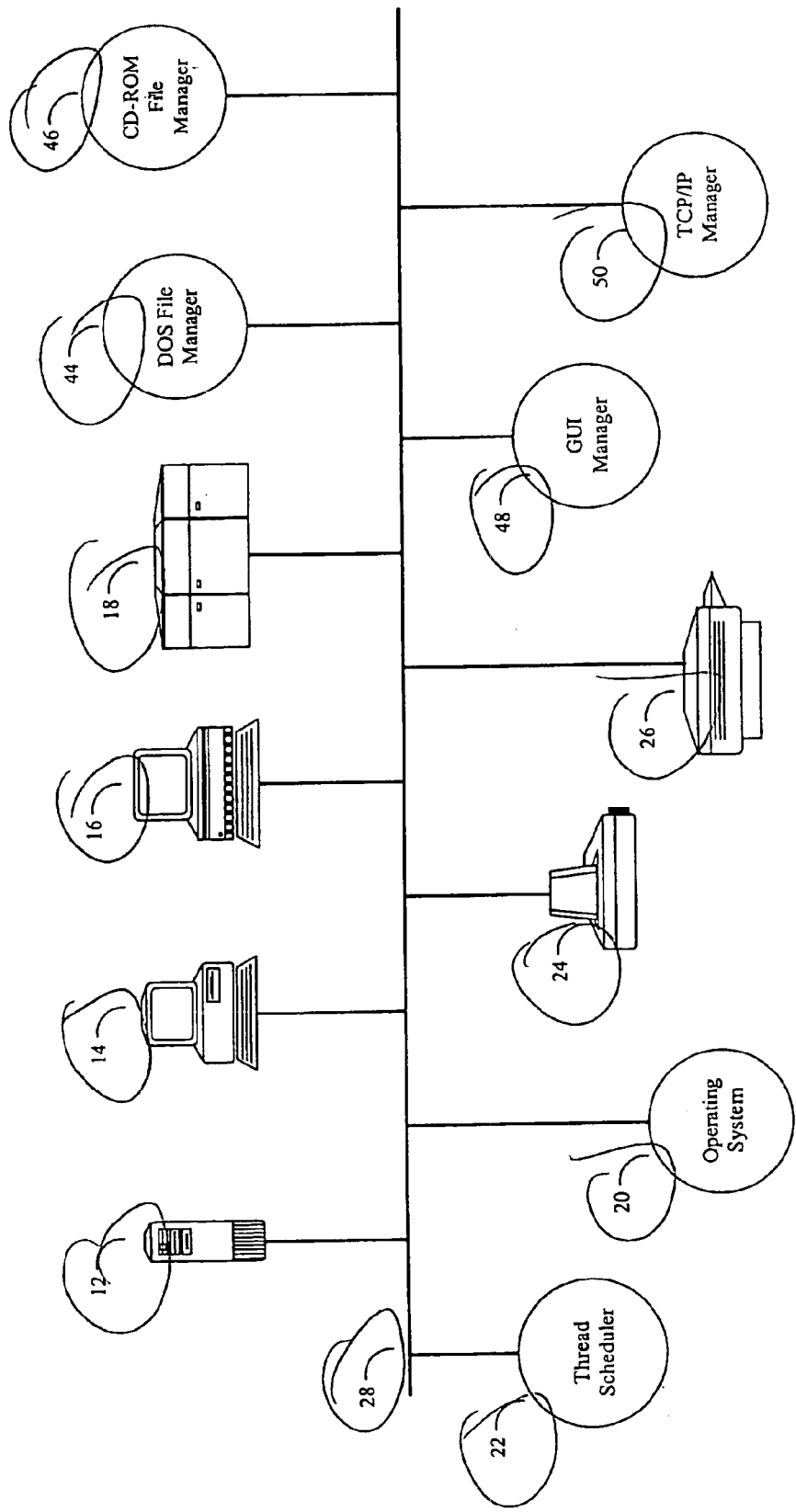
FIG. 5 presents a symbolic layout of a symmetrical multiprocessor system identifying external operating system processes in a manner of the invention.

An example of external processes which may be accessed by such a micro kernel is presented in FIG. 5. In this example, the micro kernel operating system 20 is connected to the software bus as in FIG. 3. However, additional external processes are also accessible via the software bus 28, such as the DOS file manager 44, CD-ROM file manager 46, Graphic User Interface Manager 48 and TCP/IP Manager 50. Operation and implementation of such processes are well known in the art, as are other processes which may be required. Optimal operation of the invention is obtained by implementing such processes external to the micro kernel operating system.

This modularity allows the relative size of the operating system to be greatly reduced, increasing speed of execution. Although a micro kernel is generally smaller than a monolithic operating system, it is the modularity that results in the relative improvement in speed, and allows the method of the invention to be used.

Figure 6:
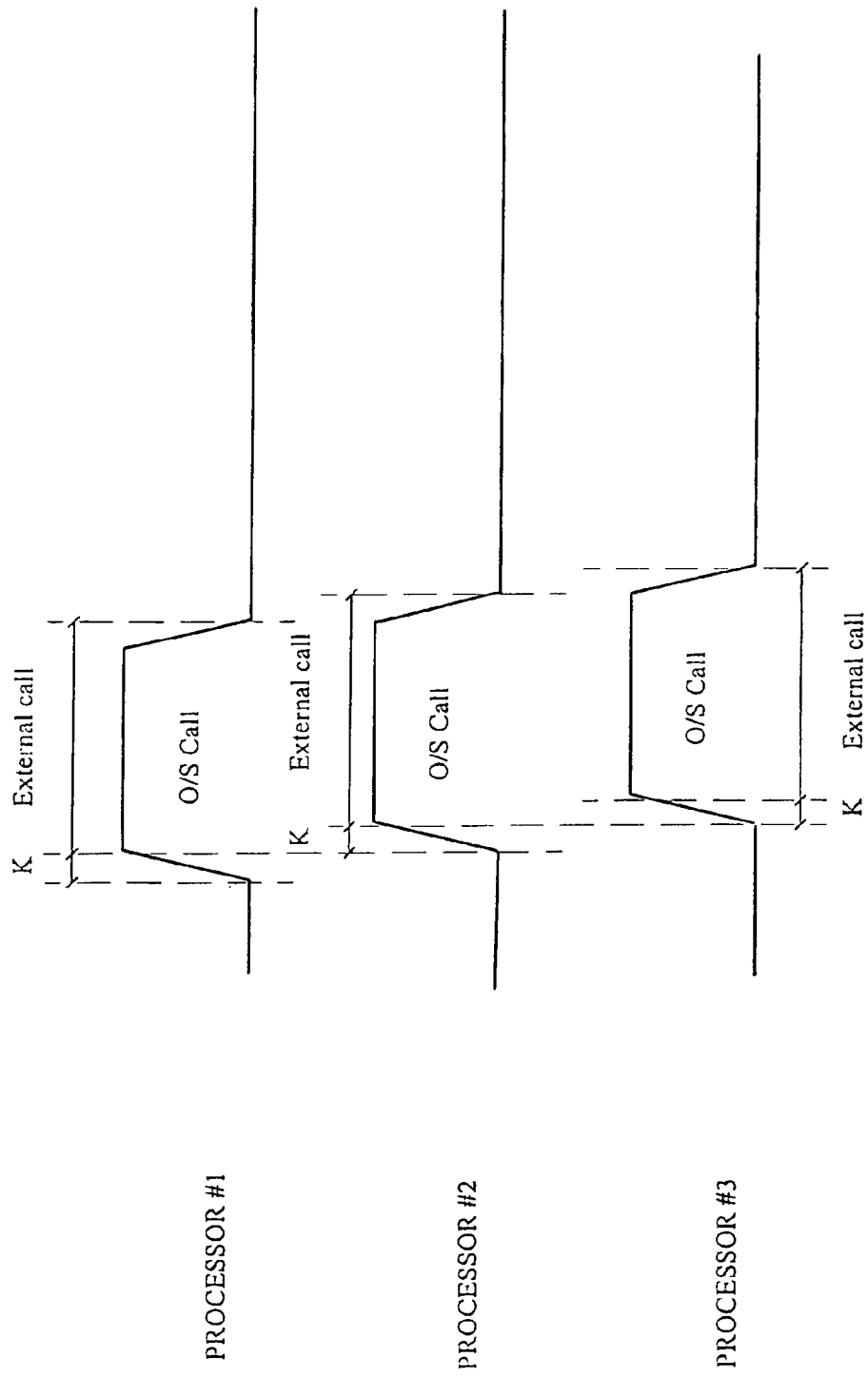
FIG. 6 presents a timing diagram of the method of the invention.

This modularity also allows the method of the invention to execute SMP much faster than the methods known in the art. FIG. 6 presents a timing diagram which compares the method of the invention to the methods described in the Background of the Invention per FIGS. 1 and 2. In FIG. 6 all three Processors 1, 2 and 3 require access to the operating system at the same time. Because the operating system is a micro kernel system, the only critical area of the operating system is in the kernel, and not in the external routine calls. The external processes are executed as priority based threads, so if the threads are scheduled properly using known techniques, there is no danger of unexpected results or errors. Therefore, a thread need only obtain the global lock to perform the kernel call, and may release it before completing the operating system call in an external process.

In FIG. 6 each Processor 1, 2 and 3 is shown to execute a kernel call designated by a "K", and an "External call". None of the kernel calls may overlap, but the external routines may. Since the kernel calls are so short, taking only microseconds to execute, the SMP system executes faster than the systems known in the art.

The relative time lengths of the calls in FIG. 6 are symbolic only. In actual practice, the external processes may not execute immediately after the kernel call if they are not required to. As well, the external processes may take hundreds or thousands of times longer to execute than the kernel call. However, the micro kernel may be designed to have a specific and predictable execution time, allowing the method of the invention to guarantee real time performance.

The degree of modularity of the operating system will depend on the processes required, and on other performance considerations. In certain applications for example, only a small number of external processes may be required. If only one or two processes are required, it may be advantageous to keep these processes with the micro kernel. Though not a micro kernel in the true sense, such an arrangement may execute a compromised version of the invention.

Clearly, the faster the micro kernel operating system executes operating system calls with respect to the exercise of collecting multiple locks, the more efficient the method of the invention will be. With consideration for the other advantages of a single lock strategy, the single lock is preferred over the multilock strategy when the time spent in the operating system call is less than the time spent searching and acquiring a large number of small locks.

Broadly speaking, the invention may be implemented by modifying known lock and thread management routines to schedule thread execution in the manner of the invention.

Determination as to whether a thread requires access to the operating system 20 at step 32 may be done in a number of manners as known in the art. For example, the thread scheduler may identify each process that a thread requires and set a boolean flag to indicate the micro kernel operating system call.

A simple compare and swap sequence may be used to obtain and release locks. Since only a single lock is being used, it is easy to set a boolean flag to indicate whether the global lock is available at step 34. Generally, locks are handed out on a FIFO (first in, first out) basis, that is, that the first thread requesting a global lock receives it. Conflicts in lock requests, that is, two or more threads requesting the global lock at the same time, must also be handled. Various techniques for handling such conflicts are known in the art, such as distinguishing the priority of operating System calls by the nature of the call, preferring those calls which impact he real time operability of the system.

As noted above, acquiring the global lock at step 38 may be handled simply y setting a boolean flag in the thread manager, or by passing a token to the thread with the kernel call. Both techniques and others, are well known in the art. The step of releasing the global lock at step 42 may be implemented in a complementary manner to that used to implement step 38.

Execution of the critical thread at step 40 may be performed in the manner known in the art, and particular to the operating system upon which the invention is applied. No additional functionality is required to implement this step in the manner of the invention.

It should be noted however, that some operation systems use a "spin lock" to protect the operating system while it is executing. This is not to be confused with the global lock of the invention which is used manage threads. The implementation of spin locks in protecting an executing operating system is well known in the art.

Step 36 of course, may also be implemented in the manner particular to the operating system upon which the invention is being implemented.

Therefore, the invention adds a small amount of overhead to access the kernel but once accessed, the code paths are all the same.

This method provides for execution of a Symmetric Multiprocessor system with a single lock. Having one lock for the whole micro kernel requires minimal time to administer, and only adds a small amount of code. Micro kernels minimize system calls by delegating to external processes which may by executed in other processors. As a result, the call to the operating system kernel takes very little time.

Because only a single lock is required, the system is able to identify the status of and acquire the lock very quickly, and there is no danger of deadlocking as in the case of multiple locks.

In contrast to monolithic operating systems, micro kernel architectures distribute the functionality of the operating system into separate files as much as possible, leaving only a kernel with message passing capabilities to administer the operating system. All file handling, input and output handling, and other operations are provided in external processes.

Because traditional monolithic kernels contain the bulk of all operating system services, they require numerous performance-robbing spin-locks in the main code paths to support SMP. In contrast, the invention uses a lean micro kernel architecture requiring only a single lock, resulting in faster performance.

Simpler implementation of SMP leads to fewer bugs and better performance. Complete linear speed up with added processors, is the ultimate goal of an SMP system, but can not be attained because there are always critical sections of the operating system that can only be executed one at a time. However, the method of the invention provides a method which will tend towards linear speed ups with reductions in the size of the micro kernel, reducing the length of the critical code to execute.

Figure 1:
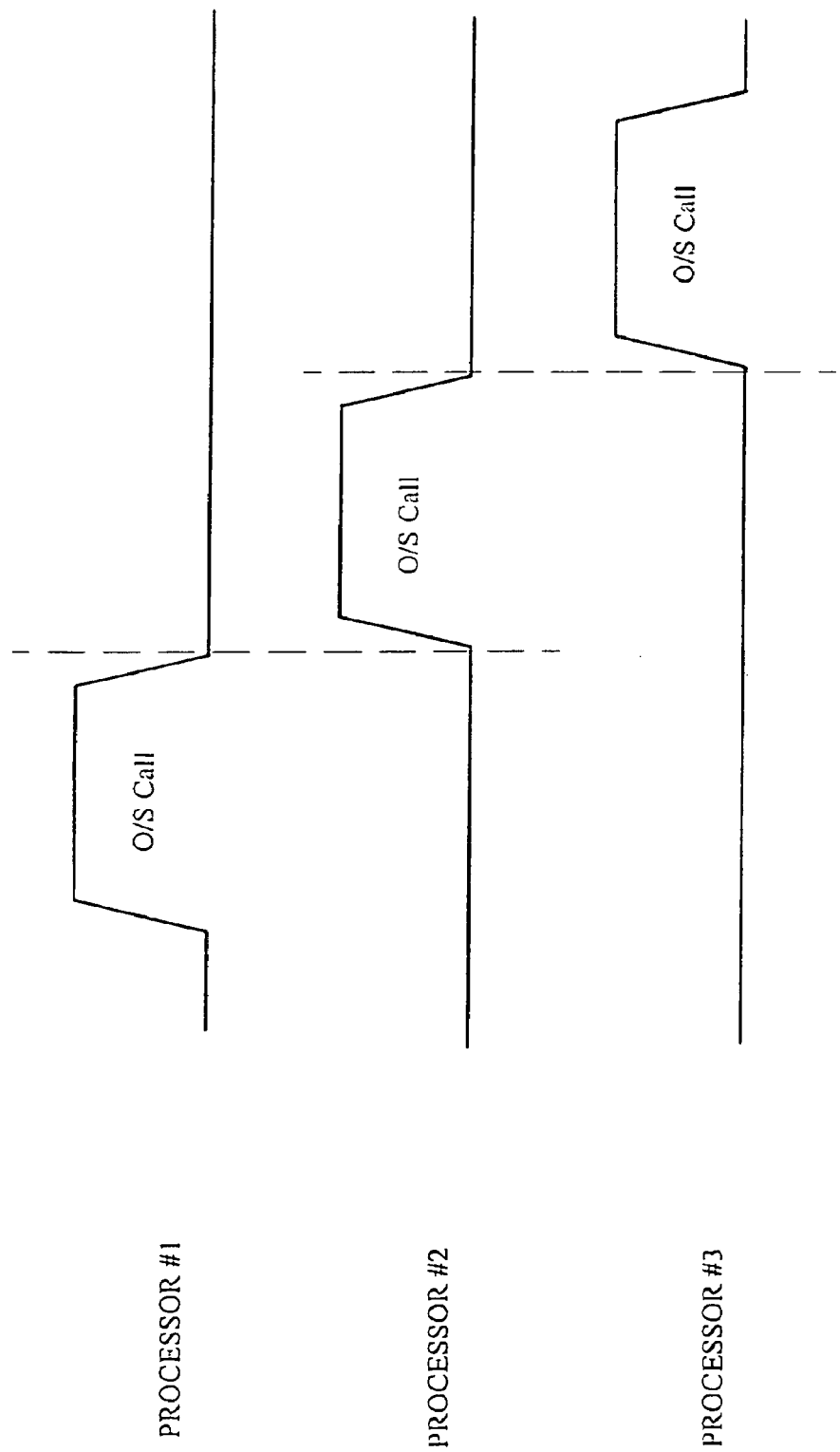
FIG. 1 presents a timing diagram of a single lock strategy as known in the art.
Figure 2:
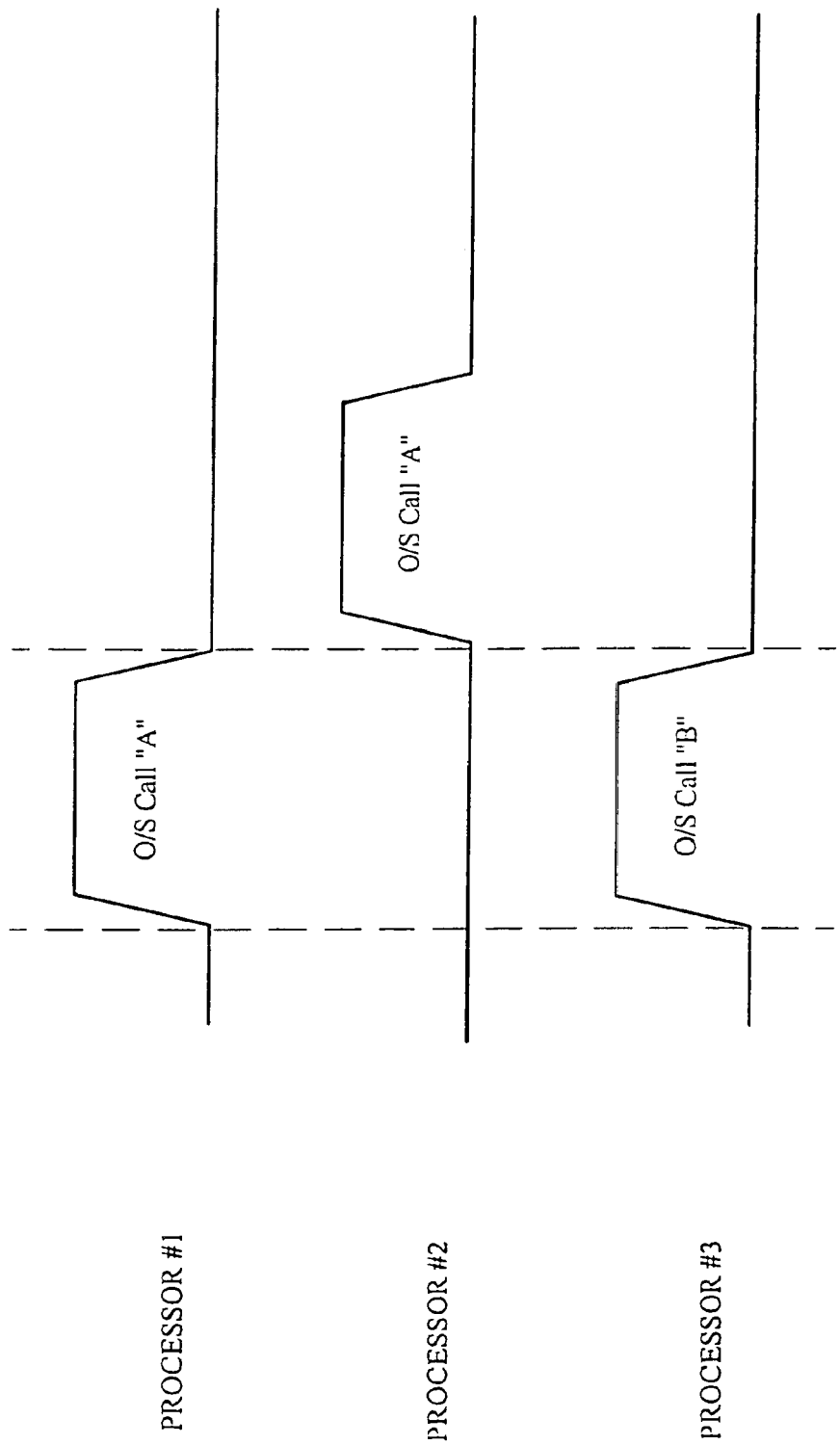
FIG. 2 presents a timing diagram of a multiple lock strategy as known in the art.

In general, a single lock SMP can only be efficiently applied to a micro kernel operating system and not to a monolithic operating system. As indicated in FIG. 1 and described above, a single lock SMP applied to a monolithic operating system results in poor performance due to the long monolithic kernel calls. The lock must wait until the kernel call has finished executing before it could take control. While waiting for the long kernel call to finish, the additional processors are idle.

However, a monolithic operating system may obtain some of the benefit of the invention by minimizing the code in the kernel and moving functionality to external locations. Message passing functions would be required for the operating system to access external processes, but such techniques are known in the art. This reduction in the size of the operating system kernel would reduce the time required to execute operating system calls, allowing the invention to be applied.

In the preferred embodiment, it is intended to implement the invention as a generic and commercially available product, as opposed to customized. The SMP functionality may be implemented as an add on to the basic operating system software, giving the User the option of either uniprocessor or SMP implementation. Basically only one file handling the global lock would have to be enabled to change from uniprocessor operation to SMP. The balance of the operating system and the user processes are unchanged, and have no knowledge of which mode the system is operating.

The most common implementation would be for an Intel X86 platform, though the invention may be applied to any platform by changing the process to suit the necessary platform API. Implementation on MIPS or PPC for example, can easily be made by modifying the SMP hardware and operating system to interact with the hardware of the new platform.

In the preferred embodiment, the invention will be applied to a real time operating system (RTOS). In a real time operating system it is required that certain functions be executed within certain periods of time. Therefore, to implement the invention, it may be necessary to prioritize operating system calls in order of how their respective call latencies impact the real time operation. This would for example, allow the kernel calls which delay the User the most, to be executed first.

As will be described with respect to FIG. 7, such an implementation requires that execution of non-critical threads may be pre-empted so that critical threads may be executed on the operating system. "Pre-emption" is the act of one thread substituting itself for another executing, dispatchable thread on a processor. For example, if a machine interrupt is received while a thread with an operating system call is holding the global lock and executing, the processor must go into an idle loop while the machine interrupt is handled, then returns and continues doing the spin. In a real time system, it is generally presumed that the machine interrupt is of the highest priority, so the delay of the kernel call being preempted is of secondary concern to the execution of the machine interrupt.

Implementation of the invention with pre-emption provides a further performance improvement over the prior art, by allowing real time operations to pre-empt non-real time operations.

Figure 7:
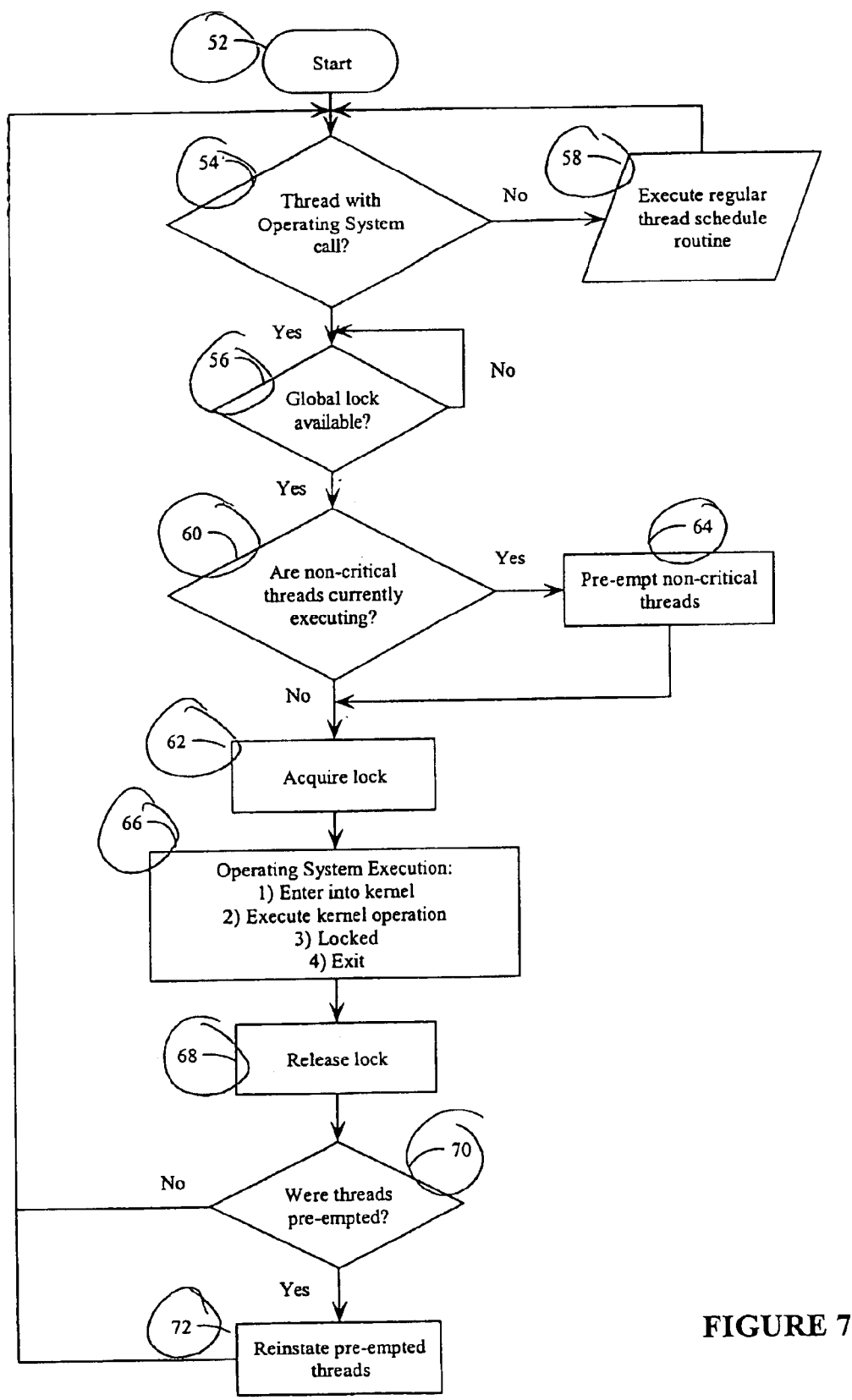
FIG. 7 presents a flow chart of a global lock management routine in the preferred embodiment of the invention.

FIG. 7 presents a flow chart of the method of the preferred embodiment. Again, a physical arrangement similar to FIG. 3 or 5 is suitable for such a method, though it is not necessary to have the same components or physical arrangement.

The method starting at step 52 builds on the method described with respect to FIG. 4. In this case, the thread scheduler responds to a thread requiring access to the pre-emptable micro kernel operating system at step 54, by requesting the global lock at step 66, while non-critical threads are managed in the manner known in the art at step 58. The thread scheduler responds to the global lock being available at step 56 by determining whether non-critical threads are currently running on the operating system 20 at step 60. If no such threads are currently executing, then the global lock may be acquired at step 62, otherwise the non-critical threads must be pre-empted at step 64.

As noted above, in the preferred embodiment, real time operation is provided by the pre-emption of lower-priority threads currently being executed. Such threads are therefore pre-empted at step 64 before the global lock is acquired. Existing thread-based operating systems have the functionality to handle machine interrupts which suspend execution of a thread to handle the interrupt. In a manner of the invention, a similar routine may be used to pre-empt execution of a thread to allow execution of the thread requiring access to the operating system. The routine which performs the pre-empting may also set a boolean flag to indicate that threads were pre-empted.

Once the global lock has been acquired at step 62, the thread call to the operating system 20 may be executed at step 66. The requires of this call will depend on the platform upon which the operating system is running, and the nature of the operating system itself. Briefly, the kernel call in the preferred embodiment will comprise execution of the following steps:

1. Entry Into the Kernel

This step includes execution of code required to pass the thread call into the kernel for execution. As noted above, some operating systems may require a special spin lock to be acquired as part of this step, to protect the operating system. This spin lock is different from the global lock which is being used as a management tool. Before leaving this step, the spin lock may be released. During this step, no pre-emption is allowed and interrupts are not handled.

2. Prologue

During this step, the necessary initializations are being executed to set up the kernel operation at step 4. No kernel data structures may be modified during this step. However, the kernel may access or verify that it can access user data during this step. This step is fully pre-emptable, and interrupts may be handled.

3. Kernel Operation

This step includes execution of the thread call to the operating system kernel. As described above, this call may comprise one of a number of file handling, data input or output, or other operating system functions. Being a micro kernel design, the bulk of the code required to handle these functions is resident in external processes, so the kernel execution generally just sets up the external process call for execution. This is the only step of the kernel call during which kernel data structures may be modified. During this period the operating system is not pre-emptable, though interrupts may be handled.

4. Epilogue

This optional step is used to complete the execution of the kernel call. Similar to the prologue of step 2 above, user data may be accessed during this step, or verification can be made that user data may be accessed. During this period the operating system is fully pre-emptable and interrupts may be handled.

5. Exit

This stage performs the return of the thread, or possibly an error message, from the operating system kernel to the processor executing the thread. Similar to the Entry step 1 above, the spin lock may be acquired at the beginning of this step and released at the end, to protect the operating system. No pre-emption is allowed during this stage, and no interrupts may be handled. To summarize the accessibility of the kernel during step 66:

| Step | Pre-emption | Interrupts |
| --- | --- | --- |
| 1. Entry | Not allowed | Not handled |
| 2. Prologue | Allowed | Handled |
| 3. Kernel Operation | Not allowed | Handled |
| 4. Epilogue (optional) | Allowed | Handled |
| 5. Exit | Not allowed | Not handled |

The global lock may then be released at step 68. As noted above, this may be done in a complementary manner to the method used to acquire the lock at step 62.

Determination is then made at step 70 as to whether any threads were pre-empted at step 64. This determination may be made on the status of a boolean flag indicating that pre-emptions were made, or by the existence of thread identities and parameters in an array used to store the pre-empted threads. if no threads were pre-empted, then the routine returns to step 54, otherwise pre-empted threads must be reinstated at step 70. Reinstatement of these threads may be performed in the manner that complements how the threads were pre-empted at step 56.

As described with respect to the general case herein above, known global lock and thread management routines may be modified to effect the invention.

The invention may also be applied with further optional features as known in the art, such as:

1. Returning threads to the processor they ran on previously to optimize memory cache performance.
2. Use of processor "affinity masking" to select which processor each thread may run on, further optimizing performance.
3. Use in embedded systems. Because of the small amount of memory required, scalability to add functionality, and performance, the invention may be applied to embedded applications.
4. Routing machine interrupts to the processor handling the lowest priority threads.
5. Adding a spin lock acquire and release around the Prologue step 2 and/or Epilogue step 4 allowing multiple calls to be in the Prologue at the same time. However, if a call was in the Kernel Operation step 3 at the time, a new call would not be able to access the Prologue step 2 or Epilogue step 4.

While particular embodiments of the present invention have been shown and described, it is clear that changes and modifications may be made to such embodiments without departing from the true scope and spirit of the invention. For example, modifications to larger or monolithic operating systems could be made to apply the teachings of the invention and realize performance improvements. As well, hybrids of the thread management system of the invention with existing management strategies may be appropriate to particular thread sizes or applications.

The operating system of the invention could be embedded into a micro controller, digital signal processor or intelligent instrumentation, operating as a piece of electronic hardware or as part of the electronic system. The invention could also be implemented in the form of machine executable software; the method of the invention being transmitted as electronic signals, or stored in machine readable or executable form in random access memory (RAM), read only memory (ROM), optical disk (CD-ROM) or magnetic storage media (hard drive or portable diskette).

An operating system in a manner of the invention could be applied to a broad range of applications, including stand-alone uniprocessor systems, multiprocessor or network-connected systems, servers, palm top or laptop computers, cellular telephones, automobile controllers and smart process control instruments. Again, such implementations would be clear to one skilled in the art, and does not take away from the invention.

Since the invention offers the best possible utilization of available processor cycles, it's ideal for very high-end real-time applications such as high-capacity telecom switches, image processing, and aircraft simulators.

What is claimed is:

1. A method of symmetric multiprocessing for an interprocess control (IPC) message-passing operating system where operating system calls execute in critical and non-critical areas, said method comprising the steps of:

responding to an operating system call requiring access to a critical area of said IPC message-passing operating system by:
  requesting a global lock; and
  responding to said global lock being available by performing the steps of:
  acquiring said global lock;
  performing said operating system call in said critical area of said IPC message-passing operating system; and
  releasing said global lock; and
  responding to said operating system call requiring access to a non-critical area of said IPC message-passing operating system by:
    performing said operating system call in said non-critical area of said IPC message-passing operating system.

2. A method as claimed in claim 1, wherein said IPC message-passing operating system includes a micro kernel operating system and wherein:

said step of responding to an operating system call requiring access to a critical area of said IPC message-passing operating system, includes the step of responding to an operating system call requiring access to a critical area of said micro kernel operating system;

said step of performing said operating system call in said critical area of said IPC message-passing operating system, includes the step of performing said operating system call in said critical area of said micro kernel operating system;

said step of responding to said operating system call requiring access to a non-critical area of said IPC message-passing operating system includes the step of responding to said operating system call requiring access to a non-critical area of said micro kernel operating system; and said step of performing said operating system call in said non-critical area of said IPC message-passing operating system includes the step of performing said operating system call in said non-critical area of said micro kernel operating system.

3. The method as claimed in claim 2, wherein said micro kernel operating system includes a pre-emptable micro kernel operating system, said method further comprising the steps of:

pre-empting any non-critical threads currently executing on said pre-emptable micro kernel operating system prior to said step of acquiring said global lock; and reinstating said preempted threads following said step of releasing said global lock.

4. The method as claimed in claim 3, wherein said step of performing said operating system call to said critical area comprises the steps of:

locking said critical area of said pre-emptable micro kernel operating system;

entering said critical area of said pre-emptable micro kernel operating system; executing operating system functions as required; and exiting said critical area of said pre-emptable micro kernel operating system.

5. The method as claimed in claim 4, further comprising the step of prioritizing execution of threads in accordance with how their respective call latencies will impact real time operation.

6. The method as claimed in claim 4, wherein said operating system includes a real time operating system, and said method further comprises the step of scheduling execution of said threads to be performed by predetermined time deadlines.

7. The method as claimed in claim 1, where said critical area of said IPC message-passing operating system is limited to the message passing functionality of said IPC message-passing operating system, and wherein said step of performing said operating system call in said critical area of said operating system comprises the step of:

performing an IPC message-pass operation for said operating system call.

8. The method as claimed in claim 7, where said IPC message passing operating system requires a message-pass before and after execution of said operating system call in said non-critical area of said IPC message-passing operating system, said method comprising the subsequent steps of:

requesting a global lock a second time; and responding to said global lock being available by performing the steps of:

acquiring said global lock a second time;

performing a second message-pass operation for said IPC message-passing operating system call; and releasing said global lock a second time.

9. The method as claimed in claim 1, wherein said IPC message-passing operating system includes a micro kernel operating system having operating system calls executing in external processes, and wherein said step of performing said operating system call in said non-critical area of said IPC message-passing operating system comprises the step of:

performing said external process for said operating system call.

10. A computer system comprising:

one or more processors;

a memory medium storing an inter-process control (IPC) message-passing operating system where operating system calls execute in critical and non-critical areas, in a machine executable form, and a lock manager in a machine executable form;

a communication network interconnecting said one or more processors, and said memory; and said lock manager being operable to:

respond to an operating system call requiring access to a critical area of said IPC message-passing operating system by:

requesting a global lock; and responding to said global lock being available by performing the steps of:

acquiring said global lock;

performing said operating system call in said critical area of said IPC message-passing operating system; and releasing said global lock.

11. An apparatus for symmetric multiprocessing comprising:

an inter-process control (IPC) message-passing operating system means where operating system calls execute in critical and non-critical areas;

means responsive to an operating system call requiring access to a critical area of said IPC message-passing operating system by:

requesting a global lock; and responding to said global lock being available by performing the steps of:

acquiring said global lock;

performing said operating system call in said critical area of said IPC message-passing operating system; and releasing said global lock.

12. A computer readable memory medium, storing computer software code executable to perform the steps of:

responding to an operating system call requiring access to a critical area of an IPC message-passing operating system by:

requesting a global lock; and responding to said global lock being available by performing the steps of:

acquiring said global lock;

performing said operating system call in said critical area of said IPC message-passing operating system; and releasing said global lock.

13. A computer data signal embodied in a carrier wave, said computer data signal comprising a set of machine executable code being executable by a computer to perform the steps of:

responding to an operating system call requiring access to a critical area of an IPC message-passing operating system by:

requesting a global lock; and responding to said global lock being available by performing the steps of:

acquiring said global lock;

performing said operating system call in said critical area of said IPC message-passing operating system; and releasing said global lock.

* * * * *